United States Patent
Dewald

(10) Patent No.: US 6,643,069 B2
(45) Date of Patent: Nov. 4, 2003

(54) SLM-BASE COLOR PROJECTION DISPLAY HAVING MULTIPLE SLM'S AND MULTIPLE PROJECTION LENSES

(75) Inventor: Duane Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/940,978

(22) Filed: Aug. 28, 2001

(65) Prior Publication Data

US 2002/0030893 A1 Mar. 14, 2002

Related U.S. Application Data

(60) Provisional application No. 60/229,826, filed on Aug. 31, 2000.

(51) Int. Cl.[7] .............................................. G02B 27/14
(52) U.S. Cl. ..................... 359/629; 359/619; 359/621; 359/627; 353/31; 353/34; 353/48; 353/49
(58) Field of Search ................................. 359/621, 619, 359/625, 629, 627, 631; 353/35, 48, 34, 49, 30, 31

(56) References Cited

U.S. PATENT DOCUMENTS 5,777,696 A * 7/1998 Inoue et al. ................. 348/752
5,883,681 A * 3/1999 Kono et al. ................. 348/751

* cited by examiner

Primary Examiner—Georgia Epps
Assistant Examiner—Tuyen Tra
(74) Attorney, Agent, or Firm—Charles A. Brill; Wade James Brady, III; Frederick J. Telecky, Jr.

(57) ABSTRACT

An optical unit (20, 30) for color projection display system that has three SLMs (21, 31) and three projection lenses (27, 37). Each SLM (21, 31) receives light of a different primary color, which it modulates to form images for that color. Each SLM (21, 31) and its associated projection lens (27, 37) provides a "channel" for that color of the final image, with the channels being converged out of the projection lenses (27, 37) to the viewing screen.

10 Claims, 2 Drawing Sheets

SLM-BASE COLOR PROJECTION DISPLAY HAVING MULTIPLE SLM'S AND MULTIPLE PROJECTION LENSES

This application claims priority under 35 USC §119(e)(1) of provisional application No. 60/229,826 filed Aug. 31, 2000.

TECHNICAL FIELD OF THE INVENTION

This invention relates to display systems, and more particularly to a display system that uses multiple spatial light modulators (SLMs) to provide color images.

BACKGROUND OF THE INVENTION

Spatial light modulators (SLMs) are increasingly being used for display applications. SLMs can be characterized by their array of pixel-generating elements, each of which is individually addressable. Image data is coded into a format that permits each pixel-generating element to be addressed for each image. Light emitted from, or reflected by, the SLM is modulated so that each element contributes a pixel of desired brightness to the overall image.

One type of SLM is the digital micro-mirror device (DMD™), manufactured by Texas Instruments Incorporated. A DMD uses an array of microscopic mirrors that build an image by rapidly switching on and off in response to the image data. The DMD is sometimes referred to as a "display on a chip" because of its monolithic formation over a CMOS address circuit. Another type of SLM is a reflective liquid crystal display.

Color images are provided by placing color filters in the optical path and by using one, two, or three SLM in one display system. Additional features of color systems depend on how many SLMs are used. For example, for a three-SLM system, a prism can be used to split and recombine color. Filters deposited on the surface of the prism split the source illumination into red, green, and blue components. Each of these colors is assigned to its own SLM, which reflects monochromatic light back into the prism. The light is then recombined, magnified, and projected onto a screen for viewing.

Three-SLM display systems do provide high brightness levels. However, in the past, such systems have tended to be more costly and less compact than display systems that use one or two SLMs.

SUMMARY OF THE INVENTION

One aspect of the invention is an optical unit for a spatial light modulator (SLM)-based color projection display system. A white light source provides a beam of white light. This beam is split into three primary colors, by two or three filters in succession. The number of filters depends on the order in which light is subtracted out of the white light.

Light of each color is delivered to an associated SLM, each of which generates images of that color. Each SLM directs its images to an associated projection lens, which projects the images to a viewing plane. The projection lenses are positioned such that the images from each projection lens converge at the viewing plane.

The color splitting may be accomplished in a least two different ways. In one embodiment, a filter at the face of each SLM transmits the desired color to that SLM. In a second embodiment, a beam splitter associated with each SLM reflects the desired color of light to that SLM. For each embodiment, if the color splitting is done in a certain order, filters are required for only two of the SLMs.

An advantage of the optical unit is that it eliminates the need for a prism to accomplish color splitting. It also uses three narrow band projection lenses rather than a single projection lens that receives the images from all SLMs. These features eliminate many disadvantages associated with using a prism and a single projection lens.

For example, a prismless design is lighter in weight and less costly. The overall size of the optical unit may be reduced because of greater flexibility in the illumination paths.

Each of the three projection lenses may be simple in design. They do not require the color correction and focal length correction that are required when a single projection lens receives images of all colors. Convergence is much simpler in that it may be accomplished by adjusting the projection lenses, rather than by required the images from the SLMs to converge to a single projection lens. The three projection lenses do not have the illumination losses that occur when a single projection lens is used. Thus, all other factors being the same, the system will have improved optical efficiency.

DETAILED DESCRIPTION OF THE INVENTION

Color Splitting with Prism and Single Projection Lens

Figure 1A:
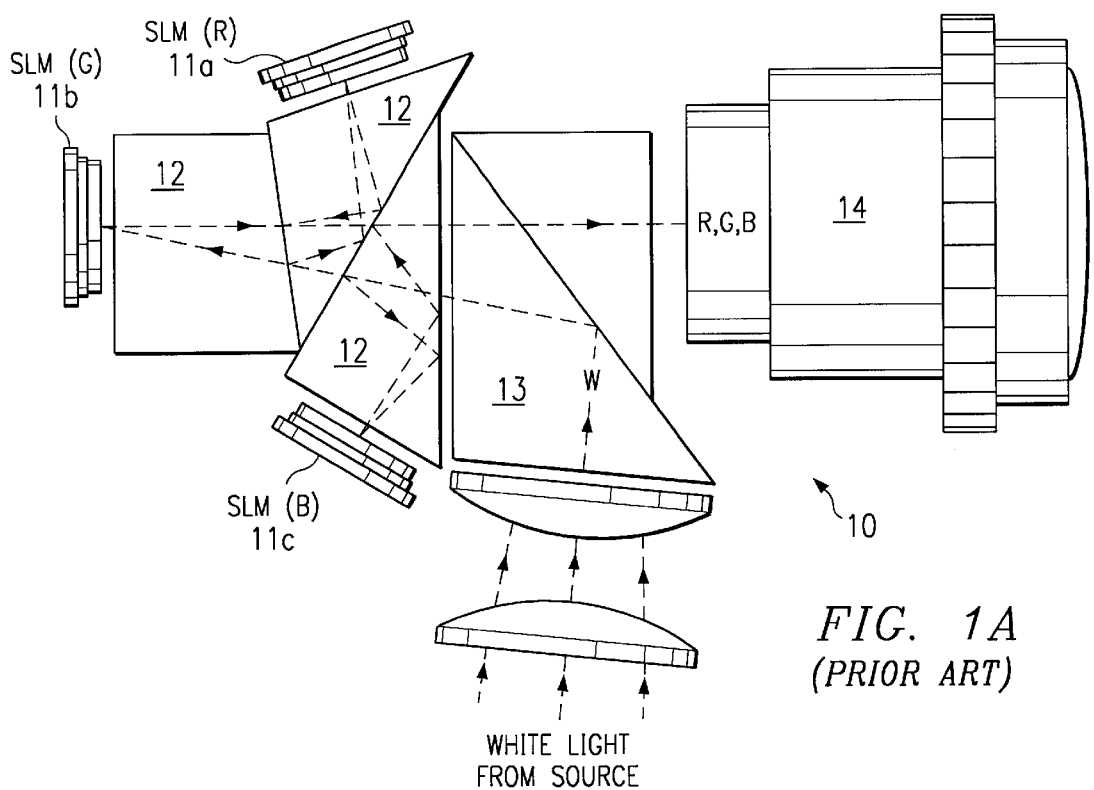
FIG. 1A illustrates a prior art optical unit having three SLMs, a prism, and a single projection lens.

FIG. 1A illustrates an optical unit 10 for a three-SLM projection display system, such as that described in the Background. For purposes of this description, the SLMs described herein are assumed to be reflective type SLMs. Optical unit 10 includes the SLMs and various optical elements used to project the image from the SLMs to a viewing screen (not shown); various electronics associated with the optical unit are not shown.

A white light source (not shown) provides the source illumination. As stated in the Background, the three SLMs 11 are each equipped with special color-splitting prisms 12 to split light. In FIG. 1A, the three SLMs 11 are separately identified as SLMs 11a, 11b, and 11c. A red SLM 11a receives only red light, a blue SLM 11b receives blue light, and a green SLM 11c receives only green light. Each SLM 11 uses its pixel-generating elements to modulate the light it receives and to reflect series of images. A TIR (total internal reflection) prism 13 recombines the light before it reaches projection lens 14.

DMD-type SLMs

Figure 1B:
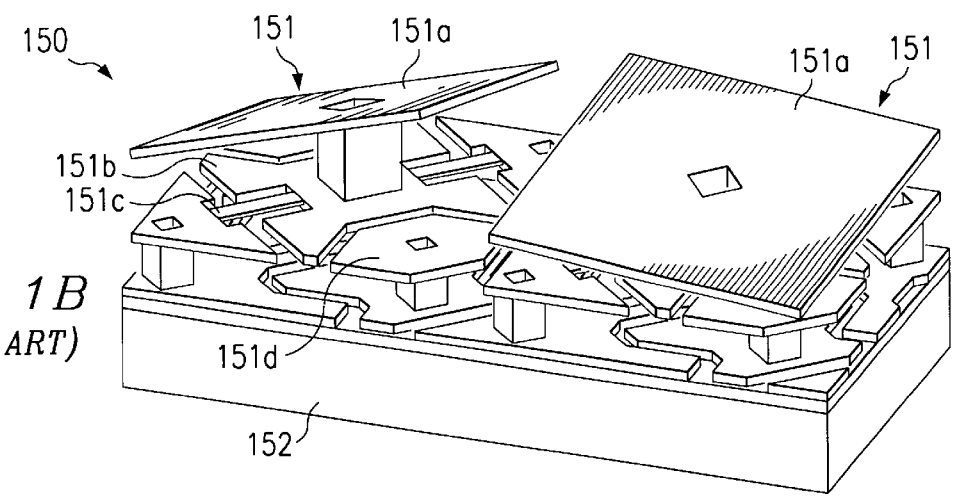
FIG. 1B illustrates two mirror elements of a DMD type of SLM.

FIG. 1B illustrates a tiny portion of a DMD 150, specifically two of its mirror elements 151. As stated in the background, a complete DMD 150 has an array of mirror elements 151 that are individually addressed to generate images. The mirror elements 151 are fabricated over a CMOS substrate 152, which has a memory cell for each mirror element 151.

The mirrors 151a of the mirror elements 151 of the DMD 150 operate such that they are in either an on or an off position for each image. Rotation of the mirrors 151a is accomplished with electrostatic attraction produced by voltage differences developed between the mirror 151a and the underlying memory cell.

One mirror position is at a tilt angle of +10 degrees, whereas the other position is at a tilt angle of −10 degrees. The light incident of the face of each mirror 151a complies with optical geometry so as to direct the light from the on mirrors to a projection lens, such as the lens 14 of FIG. 1A.

Rotation of each mirror 151a is possible because each is mounted on a hinged yoke 151b. The yoke 151b and hinge 151c are spaced from the substrate 152 and the mirror tilts to a landing surface 151d.

Color Splitting with Multiple Projection Lenses and Filter at Face of Each SLM

Figure 2:
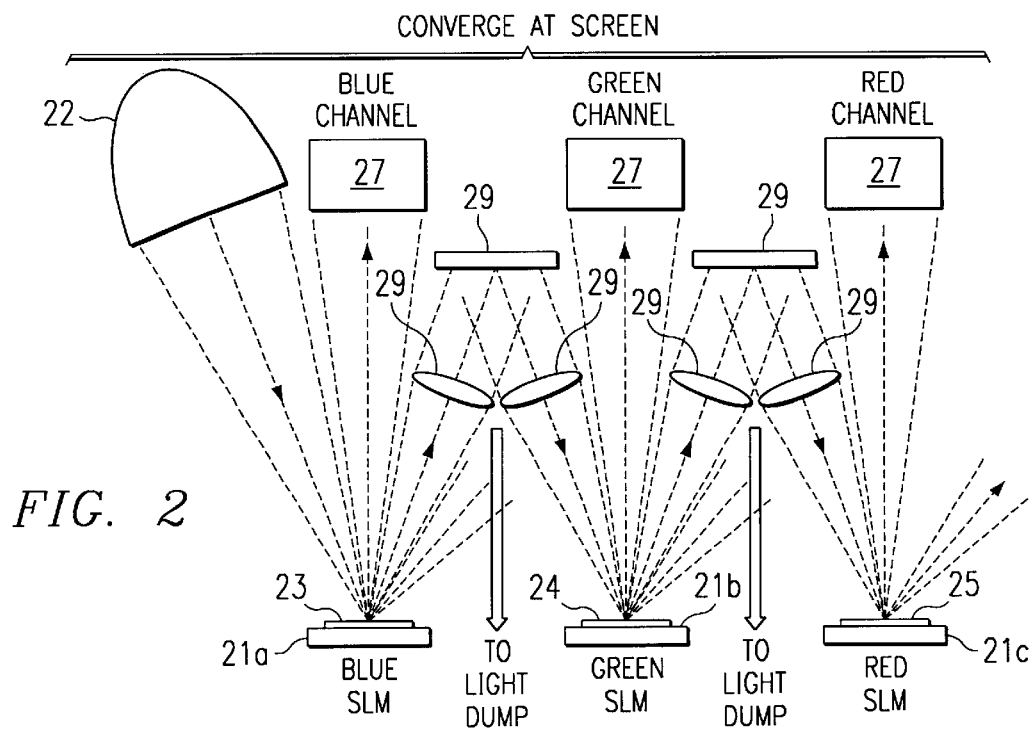
FIG. 2 illustrates a first optical unit that uses three SLMs to generate color images with multiple color channels and multiple projection lenses.

FIG. 2 illustrates a first embodiment of a three-SLM display system 20. System 20 eliminates the need for a prism and has three distinct color channels to and from three projection lenses 26.

As in the embodiment of FIG. 1A, each SLM 21 is dedicated to providing images of a particular color, i.e., red, blue, or green. However, instead of splitting light with a prism, the blue and green SLMs 21 each have a filter, such that light incident on, and reflected from, the pixel-generating elements passes through the filter. These filters are identified as filters 23 and 24 for the blue and green SLMs 21, respectively.

Typically, an SLM 21 is packaged as an integrated device with a transparent "window" covering the pixel-generating elements. Filters 23, 24, and 25 may be a layer of this window. Filters 23, 24, and 24 may be any one of various types of color-separating dichroic filters.

A white light source 22 provides the source illumination, which is imaged to SLM 21a. This imaged illumination is relayed to SLMs 21b and 21c with reflector units 29. An example of a suitable source 22 is a parabolic lamp.

In operation, white light from source 22 is focussed onto blue SLM 21a at an appropriate angle. In the example of FIG. 2, the light is incident at an illumination angle of 20 degrees. This angle is due to the tilt geometry of a DMD type SLM, whose mirrors tilt at +10 degrees and at −10 degrees. An illumination angle of 20 degrees results in reflection angle of 0 degrees for "on" mirrors. Consistent with this geometry, the illumination angle of 20 degrees ensures that each SLM 21 provides its channel of modulated images at an angle of 0 degrees to the respective projection lens 26.

Blue SLM 21a has a blue-pass filter 23 that transmits blue light to the SLM 21a and reflects longer wavelengths. For example, filter 23 might transmit wavelengths shorter than 510 nanometers and reflect longer wavelengths. In accordance with optical physics, the reflected light from blue SLM 21a is yellow light (red plus green). The transmitted blue light is incident on blue SLM 21a, which modulates the light in accordance with the image data with which it is electronically addressed. Light from the on pixel-generating elements exits the SLM 21a normal to its face and passes through projection lens 27.

As indicated in FIG. 2, the light through projection lens 26 forms a blue channel of the image to be generated. This channel, as well as the green and red channels, are converged at the viewing screen so that the viewer sees the correctly colored images. The convergence is typically accomplished by adjusting the position of the three projection lenses 27. Thus, the three color channels culminate in multiple projection axes rather than one as would be the case when a single projection lens is used.

Although it would be possible to modify the optical unit 20 to converge the three channels into a single projection lens, there are advantages to using three projection lenses. Each projection lens 27 may be a simple monochromatic lens. On the other hand, a system using a single projection lens typically requires the lens to provide color correction. Also, with three projection lenses, the effective focal lengths may be easily adjusted to correct for "lateral color", resulting in the possibility of perfect convergence.

The yellow light reflected from filter 23 is refocused and reflected with a first reflector unit 29 onto green SLM 21b. In the example of FIG. 2, reflector unit 29 is comprised of a first lens, a mirror, and a second lens, but other configurations of lenses and mirrors could be used. Green SLM 21b has a green-pass filter 24 that transmits green light and reflects light having a longer wavelength. For example, filter 24 might transmit light having wavelengths shorter than 570 nanometers and reflect light having longer wavelengths. The green light is modulated by green SLM 21b and projected with lens 27 in a manner similar to the blue channel.

The red light reflected by filter 24 of green SLM 21b is refocused and reflected with a second reflector unit 29 onto red SLM 21. The red light is modulated by red SLM 21c and projected with lens 27 in a manner similar to the blue and green channels.

If desired, yellow light can be filtered out. This filtering may occur at any point along the optical path between the blue SLM 21a and the projection lens 27 associated with the red channel. Depending on factors such as the type of source illumination, the light may tend to have more yellow than is desired for correct primary colors. In optical unit 20, a filter 25 at the face of red SLM 21c absorbs or reflects yellow light.

The embodiment of FIG. 2 could be varied so that light is filtered in any order, that is, the filtering need not be blue first, then green, then red. If the filtering order is varied, various adjustments may be required to the angles of incidence and to accommodate the angle of the reflected light due to angle dependencies associated with filter coatings.

Figure 3:
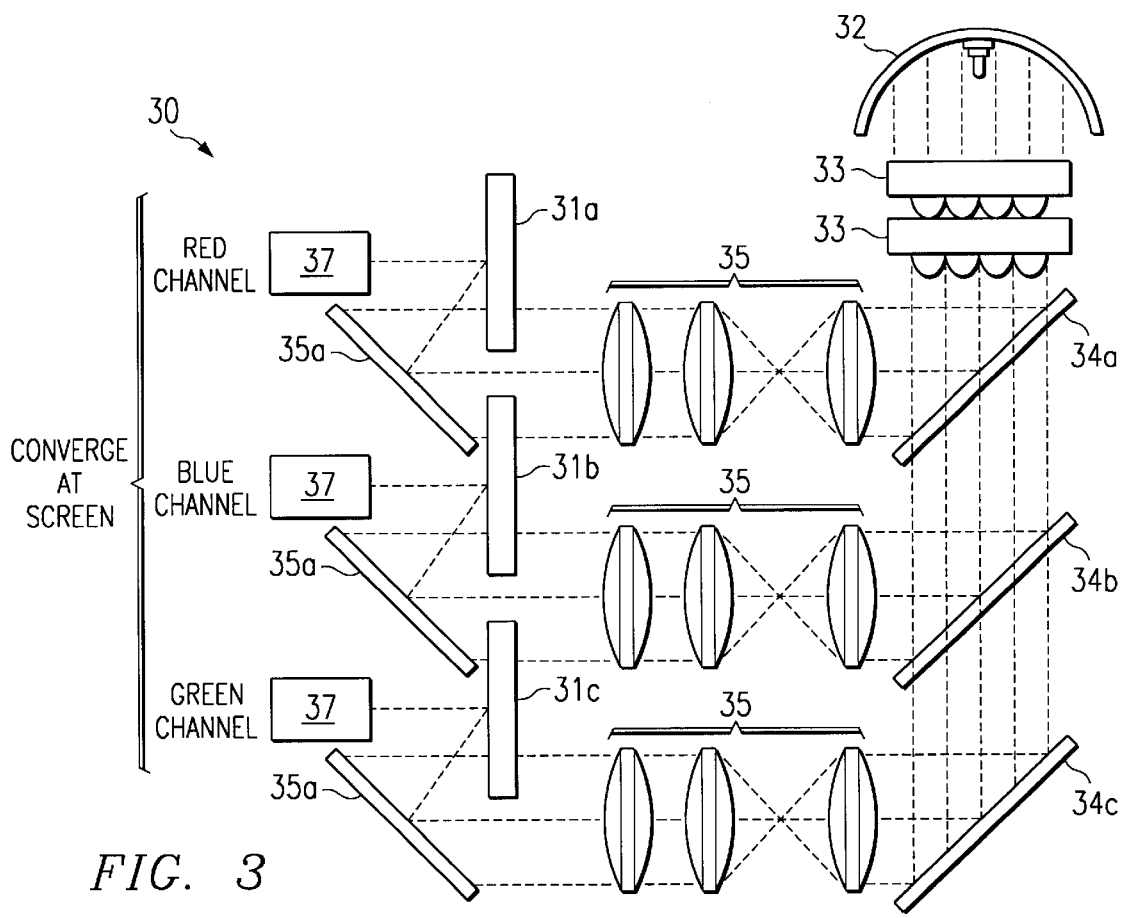
FIG. 3 illustrates a second optical unit that uses three SLMs to generate color images with multiple color channels and multiple projection lenses.

Color Splitting with Multiple Projection Lenses and Beam Splitters on Beam from Lamp FIG. 3 illustrates a second embodiment of the invention, an optical unit 30 three-SLM display system. Like optical unit 20, optical unit 30 uses three color channels and has three projection lenses.

Lamp 32 provides a white light source beam. Integrating optics 33 may be used for illumination uniformity. An example of suitable optics 33 is a pair of fly eyes lenses, as illustrated. Similar integrating optics are also optional in the embodiment of FIG. 2.

Lamp 32 and integrating optics 33 provide a collimated source beam of light. A series of beam splitters 34 is placed along this source beam.

Each beam splitter 34 reflects wavelengths of one of the primary colors and transmits other wavelengths. Thus, there is a red beam splitter 34a, a blue beam splitter 34b, and a green beam splitter 34c. The result is three channels of light reflected from beam splitters 34, each of a different primary color.

Beam splitters 34 may be either polarization-activated or wavelength-responsive beam splitters. In a more general sense, they are filters that reflect light for a desired color channel and transmit the remaining light. If desired, appropriate IR and UV filtering can eliminate light of these wavelengths. IR and UV light does not contribute to the visible image and may be undesirable due to the addition of unnecessary heat on the SLMs 31.

Beam splitters 34a and 34b may be simple plate dichroic filters, which reflect red and blue respectively. After the red beam splitter 34a reflects red for the red channel, the transmitted light to the next beam splitter 34b is a combination of IR, blue, and green. Beam splitter 34 reflects the blue light. Beam splitter 34c is an IR cut filter that transmits IR and reflects green. Any order of filtering could be used, to provide the color channels in any order. For example, the filtering could be done in red, green, blue order, in which case the blue channel would not need a filter because blue is the only color left.

Each beam splitter 34 directs its channel of light to illumination optics 35. For each channel, the associated illumination optics 35 is a set of one or more lenses that shape the light for the associated SLM 31. Thus, there are three sets of illumination optics. Each set of illumination optics 35 converts the collimated light from the associated beam splitter 34 to light focussed to an SLM 31. The imaging to each SLM 31 provided by its associated illumination optics 35 is appropriate for the illumination area on the face of the SLM 31 and maximizes the amount of light that reaches the SLMs 31.

For each color channel, illumination optics 35 includes a mirror 35a, which reflects light to the face of an associated SLM 31. If appropriate for the particular type of SLM 31, mirrors 35a are positioned to provide a desired illumination angle, such as when the SLMs 31 are DMDs.

In other embodiments, each channel of light from illumination optics 35 could be focused directly to the face of an SLM 31. This configuration would eliminate the need for mirrors 35a. An appropriate geometrical design for the color channels will prevent them from interfering.

Each SLM 31 receives one of the color channels. The three SLMs 31 are a red SLM 31a, blue SLM 31b, and green SLM 31c. Each SLM 31 modulates the light it receives and reflects images for its color to an associated projection lens 37. As in the embodiment of FIG. 2, the channels are converged at the viewing screen.

Because optical unit 30 has three projection lenses 37 rather than a single lens, optical losses are reduced. It is expected that lumens efficiency of 5:1 (lumens:watts) could be attained. For example, if lamp 32 is a 240 watt lamp, the resulting display could have a brightness up to 1200 lumens.

Figure 4:
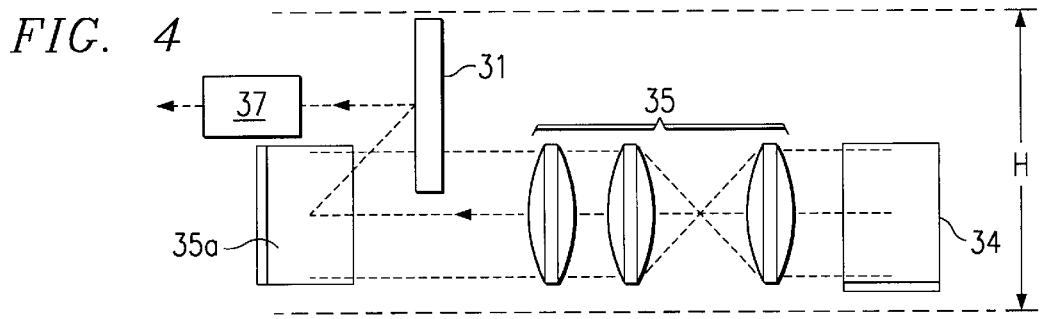
FIG. 4 illustrates how the optical unit of FIG. 3 may be contained in a housing having minimal thickness.

FIG. 4 illustrates how the optical unit 30 of FIG. 3 can be used to provide a compact display system. In the view of FIG. 4, optical unit 30 has been rotated 90 degrees, to show a side view of the optical path from only one of the beam splitters 34. In this view, the other two optical paths from the other two beam splitters 34 are hidden from view. Consistent with FIG. 3, the light path from source 37 to beam splitters 34 would be orthogonal to the light paths from the beam splitters 34 and into the plane of FIG. 4. As indicated, the entire optical unit 30 can be placed within a space that is a height, H. It is expected that this distance H could be 3.5 inches or less for the 1200 lumens system described above.

Other Embodiments

Although the present invention has been described in detail, it should be understood that various changes, substitutions, and alterations can be made hereto without departing from the spirit and scope of the invention as defined by the appended claims.

What is claimed is:

1. An optical unit for a spatial light modulator (SLM)-based color projection display system having a white light source, comprising:

three SLMs, each operable to receive light of a different primary color and to generate images of that color;

a filter at the face of each of at least two of the SLMs, each said filter operable to filter the light from said source such that it provides one of the colors to that SLM and reflects light of other colors;

a projection lens associated with each SLM, each said projection lens operable to receive the images generated by its associated SLM and to direct the images to a viewing plane; and wherein said projection lenses are positioned such that the images from each said projection lens converge at the viewing plane.

2. The optical unit of claim 1, wherein said SLMs are digital micro mirror devices.

3. A method of generating a color projection display, comprising the steps of:

addressing three spatial light modulators (SLMs) with image data for images of a different primary color;

providing a white light source beam;

filtering the source beam such that each SLM is illuminated with light of one of the primary colors by placing each filter is placed at the face of the associated SLM, such that it transmits the color associated with that SLM and reflects other colors;

using a different projection lens associated with each SLM to direct the images to a viewing plane; and positioning the projection lenses such that the images converge at the viewing plane.

4. The method of claim 3, wherein the SLMs are digital micro mirror devices.

5. The method of claim 3, further comprising the step of placing at least one additional filter along the path from the source to any of the projection lenses, the additional filter operable to filter out wavelengths of light not desired to reach the viewing plane.

6. The method of claim 3, wherein the filtering step is performed such that the filters receive the light from the source in an order that requires a filter associated with only two of the SLMs.

7. The method of claim 3, wherein the filtering step is performed such that the filters receive the light from the source in an order that requires a filter associated with each of the SLMs.

8. An optical unit for a spatial light modulator (SLM)-based color projection display system having a white light source, comprising:

three SLMs, each operable to receive light of a different primary color, and to generate images of that color;

a filter at the face of at least two of the SLMs, each filter operable to transmit the light from the source to the SLM such that it provides one of the colors to that SLM and each filter operable to reflect light of other colors;

two reflector units, each reflector unit operable to receive light reflected by the filter of the preceding SLM and to reflect light to the filter of the next SLM, such that the reflector units direct light from the source along an angular optical path from a first SLM to a second SLM and to a third SLM; and a projection lens associated with each SLM, each projection lens operable to receive the images generated by its associated SLM and to direct the images to a viewing plane; and wherein the projection lenses are positioned such that the images from each projection lens converge at the viewing plane.

9. The optical unit of claim 8, wherein a first filter is placed at the face of the first SLM and a second filter is placed at the face of the second SLM, each filter operable to transmit light of a different primary color such that the light reflected from the second filter has the color associated with the third SLM.

10. The optical unit of claim 8, wherein a filter is placed at the face of each SLM, each filter operable to transmit a color associated with that SLM.

* * * * *